United States Patent Office 3,751,567
Patented Aug. 7, 1973

---

3,751,567
SYNERGISTIC ANTIBIOTICS
Edward Alexander Konopka, Murray Hill, N.J., and Justus Melchior Gelzer, Riehen, Switzerland, assignors to Ciba-Geigy Corporation, Ardsley, N.Y.
No Drawing. Continuation-in-part of application Ser. No. 81,112, Oct. 15, 1970, which is a continuation-in-part of abandoned application Ser. No. 13,788, Feb. 24, 1970, which in turn is a continuation-in-part of application Ser. No. 809,967, Mar. 24, 1969, now Patent No. 3,644,616, dated Feb. 22, 1972. This application Jan. 17, 1972, Ser. No. 218,537
Int. Cl. A61k 21/00
U.S. Cl. 424—114
4 Claims

ABSTRACT OF THE DISCLOSURE

Rifamycines or their semisynthetic derivatives, in combination with penicillines or cephalosporines, exhibit synergistic effects against pathogens.

CROSS-REFERENCES TO RELATED APPLICATIONS

This is a continuation-in-part of application Ser. No. 81,112, filed Oct. 15, 1970, which in turn is a continuation-in-part of application Ser. No. 13,788, filed Feb. 24, 1970, now U.S. Pat. 3,644,616 which in turn is a continuation-in-part of application Ser. No. 809,967, filed Mar. 24, 1969.

SUMMARY OF THE INVENTION

The present invention concerns and has for its object the provision of new pharmaceutical or veterinary compositions, feedstuffs or feed additives comprising combinations of (1) rifamycines or their semisynthetic derivatives, with (2) other antibiotics, preferably penicillines or cephalosporines, as well as of methods for the preparation and application of these products, which are useful antibacterial agents or growth promoters.

DESCRIPTION OF THE PREFERRED EMBODIMENTS

The rifamycines of the new compositions and feed preparations are known and represent especially the rifamycines B, SV, S, O, AG or X, preferably their semisynthetic derivatives, e.g. rifamide, rifazine or advantageously rifampicin. Said component is described, intera alia, in Il Farmaco, Ed. Sci. 16, 755 and 766 (1961), 21, 68 (1966) and 22, 307 (1967); J. Med. Chem. 7, 596 (1964), 8, 790 (1965) and 11, 936 (1968); Antimicrobial Agents and Chemotherapy (Am. Soc. Microbiol.) 1965, p. 765 or 1967, p. 699, the Report of the 5th Internatl. Congr. of Chemotherapy, 1967; French Pats. Nos. 1,434,532, 1,457,- 435 and 5518M, Belgian Pat. Nos. 654,209 and 685,886, South African Pat. 68/0903 and U.S. Pat. No. 3,349,082.

The antibiotics used are also known and are represented by the group of natural or semisynthetic penicillines or cephalosporines, such as penicillin (BT, D, F, G, K, L, MV, N, O, S, V, W or X), ampicillin (A or B), ancillin, azidopenicillin, betacin, carbenicillin, chinacillin, cloxacillin, dicloxacillin, flucloxacillin, furfurylpenicillin, hetacillin, levopropylcillin, methicillin, nafcillin, oxacillin, phenoxyisopropylpenicillin, propicillin, thiphencillin; cephalosporin C, cephalexin, cephaloglycin, cephaloran, cephaloridine, cephalothin, cephazolin or hetasporin, or a therapeutically useful salt thereof. They are described, inter alia, in Erhart-Ruschig, Arzneimittel II, 1571 et seq. (Verlag Chemie, Weinheim 1968). Said book also describes the rifamycines on page 1517 et seq.

The compositions and feed preparations according to the invention contain an effective amount of the rifamycines and other antibiotics in a ratio between about 1:10 and 10:1, preferably between about 1:5 and 5:1, especially between about 1:2 and 2:1, and the usual amount of conventional excipients or extenders, whereby the total amount of both antibiotics can be less than that used in the known preparations of the new combinations.

The antibacterial effects of the new combinations can be tested either in vitro or in vivo. For example, the growth dynamics of Gram-negative or positive bacteria can be estimated in media which contain, besides the nutrients, (a) no antibiotic (control $\phi$).
(b) the rifamycines (A) or other antibiotics (B) alone,
(c) both components ($A+B$).

The single amounts of A and B used according to (c) can be half of those used according to (b). In vivo tests can be performed with various test animals, advantageously with mammals, such as mice or rats, which are challenged with a lethal or sublethal amount of pathogens, whereupon the compositions of the invention are administered. Their effect can either be determined by the curing rate of infected animals or by the recovery of viable pathogens from their organism, for example, from particular organs, such as kidneys.

Surprisingly, it has been found that the growth dynamics of pathogens, more particularly of the antibiotically less tractable Gram-negative bacteria, such as the Aerobacter, Brucella, Escherichia, Klebsiella, Mallemyces, Neisseria, Pasteurella, Proteus, Pseudomonas, Salmonella, Shigella and Vibrio strains, as well as those of Gram-positive bacteria, such as Actinomyces, Clostridia, Corynebacteria, Diplococci, Mycobacteria, Staphylococci or Streptocci, are beneficially altered by the compositions of the invention. For example, said in vitro growth dynamics according to items (a), (b) and (c) can be depicted as follows:

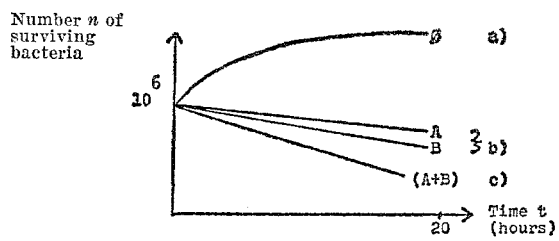

These functions $f$ ($n,t$) depicting said growth dynamics indicate that the antibacterial effect of a combination according to the invention is bigger than that obtainable with the same amount of the components.

Accordingly, the new compositions and feed preparations are superior to those of the presently used components, since lesser doses can be applied. Moreover, a suppression of resistance development can be achieved. For example, pathogens attacked with the rifamycines or their semisynthetic derivatives, seem to be more sensitive to the penicillines or cephalosporines.

Particularly useful are pharmaceutical or veterinary compositions, as well as feedstuffs and feed additives, comprising an effective amount of (1) a rifamycin selected from the group consisting of rifamycin (AG, B, O, S, SV or X), rifamide, rifampicin and rifazine or a therapeutically useful salt thereof and (2) another antibiotic selected from the group consisting of penicillin (BT, D, F, G, K, L, MV, N, O, S, V, W or X), ampicillin (A or B), ancillin, azidopenicillin, betacin, carbenicillin, chinacillin, cloxacillin, dicloxacillin, flucloxacillin, furfurylpenicillin, hetacillin, levopropylcillin, methicillin, nafcillin, oxacillin, phenoxyisopropylpenicillin, propicillin, thiphencillin; cephalosporin C, cephalexin, cephaloglycin, cephaloran, cephaloridine, cephalothin, cephazolin or hetasporin, or a therapeutically useful salt thereof.

Especially valuable are compositions and feed preparations containing a pharmacologically effective amount of (1) rifamide, rifampicin or rifazine, or a therapeutically useful salt thereof and
(2) penicillin (BT, G or V), ampicillin A, carbenicillin, cloxacillin, dicloxacillin, methicillin, nafcillin, oxacillin, cephaloridine or cephalothin, or a therapeutically useful salt thereof.

Said compositions and feed preparations advantageously contain but one of the above antibiotics mentioned under items (1) and (2) but can contain more than one of each, for example, more than one of the antibiotics listed under item (2). The preferred proportions of the active ingredients of said compositions and feed preparations range between about 1:10 and 10:1, advantageously between about 1:5 and 5:1. In addition to the active ingredients, they contain the usual amount of conventional excipients or extenders.

The pharmaceutical or veterinary compositions according to the invention contain both of said antibiotics mentioned under (1) and (2) in about the same or a lesser amount than that used in conventional compositions of the components, in conjunction or admixture with excipients suitable for either enteral, parenteral or topical application. Preferred are tablets and gelatin capsules, comprising the active ingredients together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredients listed under (1) and (2).

The feedstuffs or additives for feed or drinking water contain both of said antibiotics also in about the same or a lesser amount as that used in conventional feedstuffs or additives of the components, which are intended to promote the growth and feed efficiency of domestic animals. Said feedstuffs or additives also contain the conventional extenders, diluents and/or nutrients, such as sucrose, glucose, molasses, fermentation residues, corn meal, ground and rolled oats, wheat shorts and middlings, meat scrap, oil cake, soybean and fish meal, alfalfa, clover or grass clippings and the like, mineral supplements, such as bone meal, calcium carbonate, iodized salt and the like, vitamins, such as vitamins A, B, C and D, and other suitable substances, such as preservants, e.g. benzoic acid. The feedstuffs contain the active ingredients advantageously in the dosage range, for example, between about 0.00001 and 0.01%, whereas the additives may consist of the pure substances, when used, for example, for the drinking water, but usually contain between about 1 and 75% thereof.

The following examples illustrate the invention and are not to be construed as being limitations thereon. Temperatures are given in degrees centigrade and all parts wherever given are parts by weight.

Example 1

Conventional test tubes are filled with 10 ml. of conventional trypticase broth (c) alone, or such containing (d) rifampicin or the other antibiotics, or (e) the combinations thereof, in a concentration between about 5–20 $\mu$g./ml.

Hereupon 0.1 ml. of a freshly grown and standardized stock culture of *Escherichia coli* is added to said 10 ml. broth, so that it contains approximately $10^6$ organisms per ml. After 20 hours incubation at 37°, 1 ml. samples are removed and the number of viable cells thereon determined according to the plate dilution method. It provides from a number of bacterial cells in a properly diluted specimen an equal number of visible colonies, which can be counted.

The following results are obtained:

| Antibiotic | Concentration, $\mu$g./ml. | No. of cells after 0 hours | 20 hours |
|---|---|---|---|
| None | 0 | $1.2 \times 10^6$ | $1.2 \times 10$ |
| Rifampicin (A) | 5 | $1.5 \times 10^6$ | $1.2 \times 10$ |
| Do | 10 | $1.1 \times 10^6$ | $1.0 \times 10$ |
| Do | 20 | $1.5 \times 10^6$ | $1.0 \times 10$ |
| Ampicillin A (B) | 5 | $1.4 \times 10^6$ | $2.7 \times 10$ |
| A plus B | 5+5 | $1.4 \times 10^6$ | $2.5 \times 10$ |
| Do | 10+5 | $1.4 \times 10^6$ | $1.9 \times 10$ |

Example 2

White laboratory mice are infected by the i.p. application of a sufficient amount of the pathogens indicated in the following tables, suspended in saline, which cause death of 90–100% of untreated control animals within 48 hours. About 30–60 minutes after infection, groups of 10 mile each are treated with the antibiotics shown in the tables below, either alone or in combination, which antibiotics are administered subcutaneously as a single injection of an aqueous solution or suspension thereof.

The solutions or suspensions of the single antibiotics are then combined and a single injection of the combination administered. Said in vivo experiments are terminated at the 10th to 14th day after infection and the survivors counted.

The following results are obtained:

*Staphylococcus aureus*

| Antibiotic | Dose in mg./kg. s.c. | Percent survivors |
|---|---|---|
| None | 0 | 0 |
| Rifampicin (A) | 0.1 | 20 |
| Penicillin G (B) | 0.2 | 40 |
| A plus B | 0.1+0.2 | 100 |
| A | 0.1 | 20 |
| B | 0.1 | 10 |
| A plus B | 0.1+0.1 | 60 |
| A | 0.05 | 0 |
| B | 0.2 | 40 |
| A plus B | 0.05+0.2 | 90 |
| A | 0.05 | 0 |
| B | 0.1 | 10 |
| A plus B | 0.05+0.1 | 30 |
| None | 0 | 0 |
| Rifampicin (A) | 0.1 | 20 |
| Cephaloridine (C) | 0.05 | 40 |
| A plus C | 0.1+0.05 | 100 |
| A | 0.05 | 0 |
| C | 0.05 | 40 |
| A plus C | 0.05+0.05 | 90 |
| None | 0 | 0 |
| Rifampicin (A) | 0.1 | 20 |
| Ampicillin A (D) | 0.05 | 0 |
| A plus D | 0.1+0.05 | 100 |
| A | 0.05 | 20 |
| D | 0.05 | 0 |
| A plus D | 0.05+0.05 | 20 |

| *Pseudomonas aeruginosa* | | |
|---|---|---|
| Antibiotic | Dose in mg./k. s.c. | Percent survivors |
| None | 0 | 0 |
| Rifampicin (A) | 20 | 10 |
| Carbenicillin (B) | 200 | 0 |
| A plus B | 20+200 | 100 |
| A | 10 | 0 |
| B | 200 | 0 |
| A plus B | 10+200 | 30 |

Example 3

Male albino rats, weighing approximately 200 grams, are anesthetized by s.c. injection of sodium pentabarbital and their bladder exposed by a small, suprapublic incision. Thereupon a saline suspension of about $10^6$ or *Proteus mirabilis* cells (consisting of a mixture of rifampicin sensitive and reistant cells) is injected into the lumen of the bladder.

Treatment with rifampicin (A) and carbenicillin (B), each alone and in combination, is started on the 5th day after infection and contained for 15 days, 5 days per week. On the 28th day after infection, all surviving animals are sacrificed, both kidneys removed aseptically and macerated in a tissue grinder. Appropriate dilutions are made with Soerensen's buffer at pH=7 and the number of organisms present in said diluted kidney homogenate is determined by plating aliquots thereof on trypticase soy agar medium and incubating it for 48 hours at 37°.

In addition to the determination of the total number of viable cells in the diluted kidney homogenates, also the number of resistant cells within the total bacterial population is determined. This is done by counting those cells capable of growing in said trypticase soy agar medium containing an additional 100 γ/ml. of A or 10 γ/ml. of B.

The following results were obtained in recovering the $\log_{10}$ number of viable *P. mirabilis* cells from rat kidneys:

| Controls | 50 mg./kg. s.c. A | 100 mg./kg. s.c. B | 50+100 mg./kg. s.c. A+B |
|---|---|---|---|
| 7.46 | <1.0 | 6.80 | <1.0 |
| 7.99 | a 5.99 | 7.38 | >1.0 |
| 8.36 | a 6.78 | 7.51 | <1.0 |
| 8.46 | a 6.97 | 7.68 | <1.0 |
| 8.48 | a 7.18 | 7.73 | <1.0 |
| 8.52 | a 7.75 | 7.80 | <1.0 |
| 10.20 b | a 8.11 | 8.28 | 2.44 |
| | | c 9.04 | 7.83 | a A-resistant population virtually equal to population recovered.
b A-resistant population recovered is 3.0.
c B-resistant population present is 2.43.

The above results clearly illustrate the synergism between A and B, when used as combination at subtherapeutic levels of B. A complete elimination of the infecting organisms occurred in six of eight rats treated with the combination. The cells present in the kidneys of the two remaining animals were significantly reduced in one animal, however, and in all instances the isolated, infecting organisms were sensitive to A.

The cell populations recovered from the kidneys of rats treated with either A or B alone at said dosage levels were almost equal to the number recovered from the untreated control group. That treated with the minimal therapeutic dose of rifampicin harbored a bacterial population that was converted in six animals to a completely resistant population, a phenomenon that is prevented from occurring when using A in combination with B.

Example 4

Similar results as shown in the previous examples are obtained with said sensitive or resistant organisms and other penicillins or cephalosporins, more particularly penicillin (BT, G or V), ampicillin A, carbenicillin, cloxacillin, dicloxacillin, methicillin, nafcillin, oxacillin, cephaloridine or cephalothin, or a therapeutically useful salt thereof in combination with rifampicin, rifamide or rifacine. Said resistant organisms remain sensitive to said antibiotics as illustrated by Example 3.

Example 5

Preparations of 1,000 capsules each containing 300 mg. of the active ingredients:

| Formula: | G. |
|---|---|
| Rifampicin | 150 |
| Ampicillin | 150 |
| Talcum | 36 |
| Corn starch | 24 |
| Magnesium stearate | 16 |
| Lactose | 4 |
| | 380 |

Procedure: All powders are passed through a screen with an opening of 0.6 mm. and mixed throughly. 0.5 ml. hard gelatine capsules are filled with 380 mg. of said mixture, using a capsule filling machine. Instead of ampicillin, an equieffective amount of the other penicillines or cephalosporines listed above can be used in said formula.

Example 6

Preparation of a poultry feed containing 0.005% of the active ingredients:

| Premix: | G. |
|---|---|
| Rifampicin | 25 |
| Ampicillin | 25 |
| Confectioners sugar | 50 |
| Soybean feed, solvent extracted | 275 |
| | 375 |

| Feed formula: | Pounds |
|---|---|
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-Methionine | 1.5 |
| Vitamin premix | 10.0 |
| | 2000.3 |

10 lbs. of the vitamin composition contain: 16,000,000 I.U. Vit. A, 1,000,000 I.U. Vit. $D_3$, 5,000 I.U. Vit. E acetate, 6 g. Vit. $K_3$, 6 mg. Vit. $B_{12}$, 3 g. riboflavin, 30 g. niacin, 5 g. calcium pantothenate and 100 g. ethoxyquin, made up to 10 lbs. with corn meal.

Procedure: The antibiotics and sugar are mixed thoroughly, screened through a sieve with 0.6 mm. openings and blended with the soybean feed. The premix is then added to the feed in such amount as to obtain said concentration and the whole is homogenized in a horizontal drum mixer. Instead of ampicillin, an equieffective amount of the other penicillines or cephalosporines listed above can be used in said premix.

We claim:

1. An antibiotic pharmaceutical or veterinary composition, comprising a Gram positive or negative antibiotically effective amount of (1) rifampicin, (2) cephaloridine or a therapeutically useful salt of either component, in the proportions between about 2:1 and 1:1, and (3) a conventional pharmaceutical excipient or animal feedstuff.

2. A pharmaceutical or veterinary composition as claimed in claim 1, containing between about 0.1 to 75% of the components (1) and (2) in a pharmaceutical excipient.

3. A feedstuff as claimed in claim 1, containing between about 0.00001 and 0.01% of the components (1) and (2) in a feedstuff.

4. A feed additive as claimed in claim 1, containing between about 1 and 75% of the components (1) and (2) in a feed additive.

References Cited

Virchow et al.: Dtsch. Med. Wschr. 92.Jg, N+48, December 1967, pp. 2217–2220.

The Merck Index, 8th ed., 1968, Merck & Co., Inc., p. 222.

Chemical Abstracts 68: 94475n (1968).

JEROME D. GOLDBERG, Primary Examiner